United States Patent [19]
Sterritt

[11] 3,973,334

[45] *Aug. 10, 1976

[54] EYE-HAND PERCEPTUAL-MOTOR TRAINING DEVICE

[76] Inventor: Graham M. Sterritt, 560 S. Corona, Denver, Colo. 80209

[ * ] Notice: The portion of the term of this patent subsequent to Nov. 27, 1990, has been disclaimed.

[22] Filed: Apr. 7, 1975

[21] Appl. No.: 565,400

Related U.S. Application Data

[63] Continuation of Ser. No. 402,997, Oct. 3, 1973, abandoned, which is a continuation-in-part of Ser. No. 302,730, Nov. 1, 1972, Pat. No. 3,774,318.

[52] U.S. Cl. ................................. 35/35 R; 35/9 C
[51] Int. Cl.² ........................................ G09B 17/00
[58] Field of Search ............ 35/9 C, 9 A, 9 B, 22 R, 35/29 C, 35 R, 35 D, 36, 37

[56] References Cited
UNITED STATES PATENTS

| | | | |
|---|---|---|---|
| 2,958,956 | 11/1960 | Olalainty | 35/36 X |
| 3,057,082 | 10/1962 | Wellington et al. | 35/9 C |
| 3,346,968 | 10/1967 | Dellinger | 35/6 |
| 3,477,142 | 11/1969 | Cornell et al. | 35/9 A |
| 3,508,349 | 4/1970 | Gilden et al. | 35/35 D |
| 3,672,074 | 6/1972 | Huffstetter | 35/35 H |
| 3,683,516 | 8/1972 | Fass | 35/37 |
| 3,690,020 | 9/1972 | McBratnie | 35/37 |
| 3,774,318 | 11/1973 | Sterritt | 35/9 C X |

*Primary Examiner*—William H. Grieb
*Attorney, Agent, or Firm*—Fitch, Even, Tabin & Luedeka

[57] ABSTRACT

An eye-hand perceptual-motor trainer trains a student to make sequential predetermined perceptual motor responses. A visual-kinesthetic sequence training board has a plurality of stations, as in the form of metallic segments, spatially arranged in a predetermined manner. A sequencing means, such as one comprising a digital counter, has a plurality of unique output states each corresponding to a respective one of the board stations. Each time the sequencing means is actuated, it advances from one state to the next in the same sequence as the corresponding stations are to be touched by the student. As the student touches the respective stations of the training board, a comparator compares the state of the sequencing means with the station touched by the student. A comparison signal is applied to display means which provides feedback to the student as to whether or not he is performing correctly in the proper sequence.

22 Claims, 7 Drawing Figures

EYE-HAND PERCEPTUAL-MOTOR TRAINING DEVICE

This application is a continuation of copending application Ser. No. 402,997, filed Oct. 3, 1973, now abandoned, which itself was a continuation-in-part of application Ser. No. 302,730 copending therewith, filed Nov. 1, 1972 for a Directionality Trainer, issued Nov. 27, 1973 as U.S. Pat. No. 3,774,318.

This invention relates generally to teaching aids, more specifically to an eye-hand skills trainer providing opportunities for perceptual-motor scribing responses in association with common geometric forms, including lines, simple closed figures, alphanumeric characters, etc., and still more specifically to a device with a plurality of boards providing a sequence of tracing tasks graduated in difficulty, with electronic monitoring of the student's tracing responses, providing feedback that informs the student immediately whether he is correct or incorrect in the sequence and precision of his tracing responses.

Preschool, kindergarten and first grade teachers provide a great deal of eye-hand coordination training in workbook and rote drill-and-practice exercises involving drawing straight and curved lines, simple geometric figures, numerals, and manuscript and cursive letters of the alphabet. Unless the teacher sits with each pupil individually, however, the student gets feedback about the accuracy of his work only after relatively long delays. Immediacy of discriminitive feedback is an important factor determining the speed and success of learning. Thus there is a need for a means for automatically monitoring the accuracy of the student's eye-hand skill in drawing or tracing, with immediately discriminitive feedback helping him to evaluate his responses.

The device of the present invention is designed to stimulate young children to perform the desired task with minimum attention from a teacher and to provide instant, automatic feedback to the pupil as to the correctness of his performance.

The present invention is directed to a subcombination generally disclosed in the aforementioned copending application Ser. No. 302,730 for the electronic monitoring of the student's responses. However, whereas the prior application was directed specifically to directionality training and included features designed to minimize the motor skills required, the present invention is more flexible and has broader applicability. The present invention includes monitoring apparatus and circuitry in combination with a plurality of different visual-kinesthetic sequence training boards affording training in different skills and at different levels of skill.

The device of the present invention includes a console on the top or face of which is disposed a visual-kinesthetic sequence training board, the surface of which has a plurality of stations, as in the form of metallic segments, disposed thereon for touching by the student and spatially arranged in a predetermined manner. A sequencing means, such as one comprising a digital counter, has a plurality of unique input or output states each corresponding to a respective one of the board stations. (As will be discussed further below, the converse is not necessarily the case, and the same station may correspond to more than one of the unique states.) Each time the sequencing means is actuated, it advances from one state to the next in the same sequence as the corresponding stations are to be touched by the student. As the student touches the respective stations of the training board, a comparator compares the state of the sequencing means with the station touched by the student and in response to such comparison actuates the sequencing means and produces an evaluation signal indicating whether or not the student is touching the stations in the proper sequence. The evaluation signal is applied to display means which provides feedback to the student as to whether or not he is performing correctly in the proper sequence. Should the student follow any other sequence in touching the respective stations of the visual-kinesthetic sequence training board, the comparator notes the lack of correspondence between the station touched and the state of the sequencing means, and the evaluation signal thereupon produced causes the display means to indicate to the student that he has erred.

The training boards included with this device are printed circuit boards or boards painted with conductive paint, each of which bears a plurality of conductive segments connected to edge connector contact pads via copper paths on the underside of the board. Plugging the board into the console of the device couples the segments to the electronic circuitry in the console. This circuitry monitors the sequence in which the segments are encountered by a probe directed by the student. Preferably, the area surrounding the line to be traced is metallic, and is flush with the line to be traced. This metallic "surround" area is coupled to the error-detection circuitry. If the probe enters this area, the student is immediately informed that he has not been sufficiently precise in his tracing and must start again from the beginning. Thus, the present device permits the pupil to wander off the intended path, and provides automatic feedback informing him of such "wandering" errors.

To encourage the gradual development of skills, the first boards to be traced may involve relatively simple figures, such as straight horizontal, vertical and diagonal lines, curves, etc., with relatively broad paths requiring minimal visual-motor accuracy. Subsequent boards may then involve figures which are more complex and tracing paths which are narrower, requiring greater care on the student's part in order to trace the figures accurately without allowing the probe to enter the background area. The figures may be alphanumeric characters, and in particular may comprise such figures of gradually diminishing size.

It is expected that each figure will be traced in a predetermined sequence, set by penmanship conventions or signalled by an indicator at the starting place, first major leg of the figure to be traced, second, etc. Any departure from this sequential order generates an error signal which turns off power, requiring that the student activate the start mechanism and begins tracing again from the beginning. Similarly, if the stylus leaves the intended path and contacts the metallic background area, power is turned off automatically and the pupil must begin again as indicated above. If, on the other hand, the pupil scribes the entire figure in the intended sequence without touching the background area, then visual indication of correctness is provided as long as the stylus is in contact with a segment that is sequentially correct, and upon contacting the last segment of the series, visual indication of correct completion is provided so that the student is informed and can call his success to his teacher's attention!

In one form of the invention, the segments are not disposed along a path but rather are disposed to be separately touched in an order directed by alphanumeric symbols associated with the respective segments, thus teaching counting and alphabet skills and recognition of alphanumeric characters as well as motor skills.

It is therefore an object of the present invention to provide a device for teaching perceptual-motor skills. It is a further object of the present invention to provide a device for teaching the student sequential perceptual-motor scribing responses. It is another object of the present invention to provide a device visually observable by a student and operable by the movement of the student's hand over it and providing an indication to the student as to whether or not he is following the proper sequence.

Other objects and advantages of the present invention will be evident from the following detailed description, particularly when taken in conjunction with the appended drawings, in which.

Figure 1:
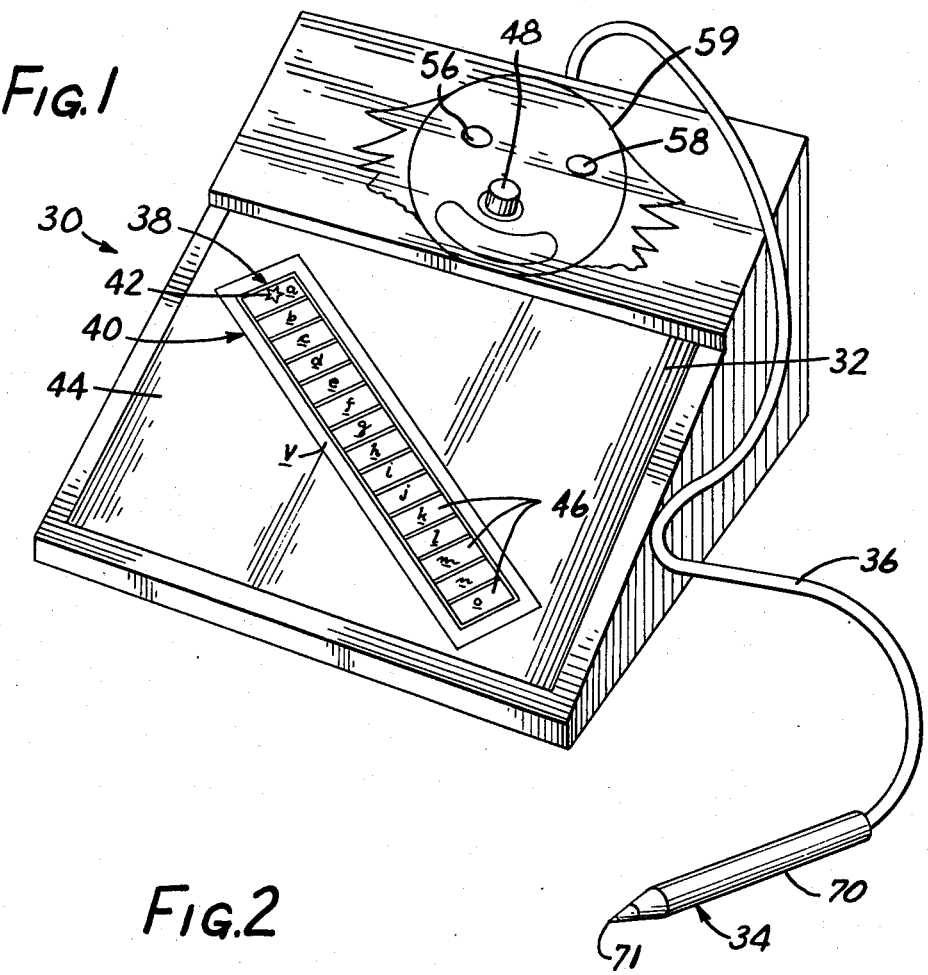
FIG. 1 is a perspective view of one form of the training device of the present invention.

In the form of the invention particularly illustrated, a console 30 has on its top or face a removable visual-kinesthetic sequence training board 32. A stylus, scribe or probe 34 is electrically connected to the console 30 by a cable 36. The console 30 contains various logic and other circuits for determining whether or not a student performs properly in moving the stylus 34 over the surface of the visual-kinesthetic sequence training board 32. The circuitry is illustrated in block diagram form in FIG. 2 and in greater detail in FIG. 3. A path 38 that it is desired to have the student trace in a particular manner is visibly displayed. The path 38 is outlined by a border 40. The start of the path 38 may be indicated by a symbol such as a star 42. The rest of the board 32 is covered by an insulating coating 44.

Figure 2:
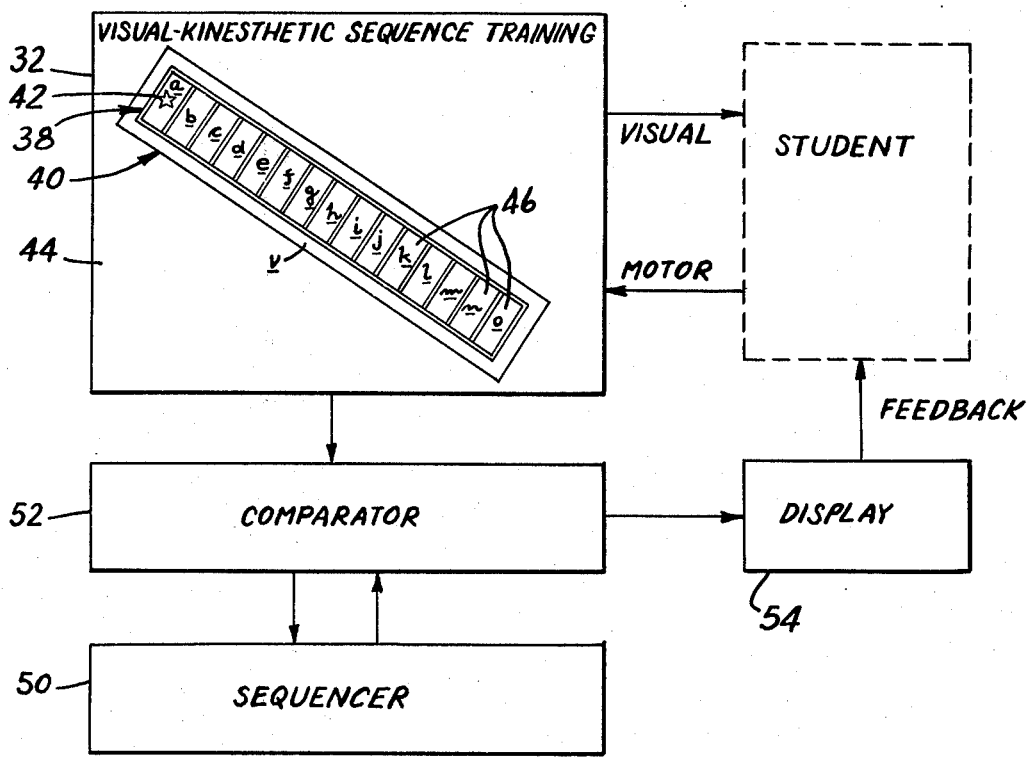
FIG. 2 is a diagrammatic illustration of the functional units of the invention illustrated in FIG. 1.
Figure 4:
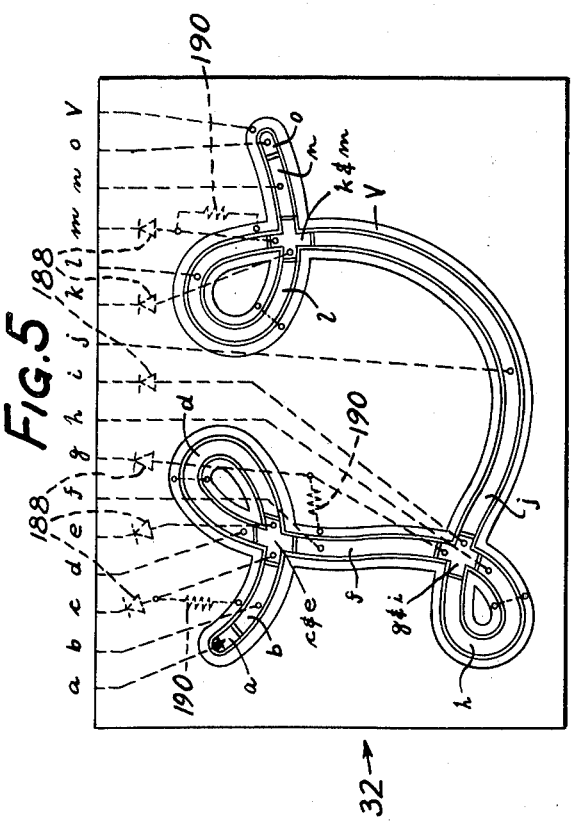
FIG. 4 is a plan view of the visual-kinesthetic training board illustrated in the device illustrated in FIG. 1, with the covering coating removed and with conductors on the top side of the board shown by solid lines and conductors on the underside of the board shown by dashed lines, there being connections between the two sides at the dots, and showing a simple path to trace.

For the board 32 as shown in FIGS. 1, 2 and 4, the path is a simple, broad diagonal path. For the board 32 shown in FIG. 5, the path is a relatively complex, convoluated narrow path. For the board 32 shown in FIG. 6, the path is comprised of the separate segments of the letter A. As illustrated path 38 passes a plurality of stations each of which comprises a respective electrically conductive segment 46a–o insulated from one another but connected to internal electronic circuitry by conductors 47 formed on the visual-kinesthetic sequence training board 32. A similar electrically conductive segment 46v surrounds the path. The conductive segments 46 and the conductors 47 may be formed by conventional printed circuit techniques. The insulating coating 44 covers any conductors 47 on the top side of the board 32. The spacing between segments 46a–o and v are preferably filled in with insulation also so that the top surface of the board 32 is relatively smooth, providing no mechanical guidance for the student, who must therefore depend upon his own visual-motor control to trace the path 38 in the required fashion.

The student with stylus 34 in hand observes the visual-kinesthetic sequence training board 32, noting the path 38. He may or may not observe the individual conductive segments 46a–o, as the overall path 38 is more evident than the individual segments. However, he can see that the path is bounded by the border 40 formed by the segment 46v. Pursuant to instruction or demonstration, the student actuates the device by pressing a pushbutton 48 and then scribing the segments 46a–o with the stylus 34. The instructions are to trace or scribe the path 38 from end to end starting at the scar 42.

As promised by the instructions, the device of the present invention monitors the student's performance and informs him whether or not he has performed properly. The device illustrated includes (FIG. 2) a sequencing means 50 comprising an electronic digital counter having a plurality of unique output states each corresponding to a respective segment 46a–o. Each time the counter is actuated, it advances from one state to the next in the same sequence as the corresponding segments are arranged. The counter also provides an output signal indicative of its state. When the student takes the probe 34 in hand and touches or scribes a particular segment 46a–o or v, a comparator 52 compares the state of the sequencing means 50 with the position of the stylus 34 on the tracing board 32, that is, which segment 46a–o or v is being touched. Depending upon whether or not the state of the sequencing means 50 corresponds with the position of the stylus 34, the comparator actuates the sequencing means 50 once to advance it to its next state and applies an output signal to a display unit 54. As illustrated, the display unit 54 comprises lamps 56 and 58 on the console 30. Depending upon the programing of the display unit, one lamp may indicate whether or not the student is performing properly, and the other lamp may indicate when he has completed the proper scribing of all segments in proper succession. This information is observed by the student and constitutes both information and a reward encouraging proper performance. To stimulate the student's interest, the display unit may be made decorative and entertaining, as by depicting the face of a clown 59 on the console 30 and having the pushbutton 48 for his nose and the lamps 56 and 58 for his eyes.

Figure 3:
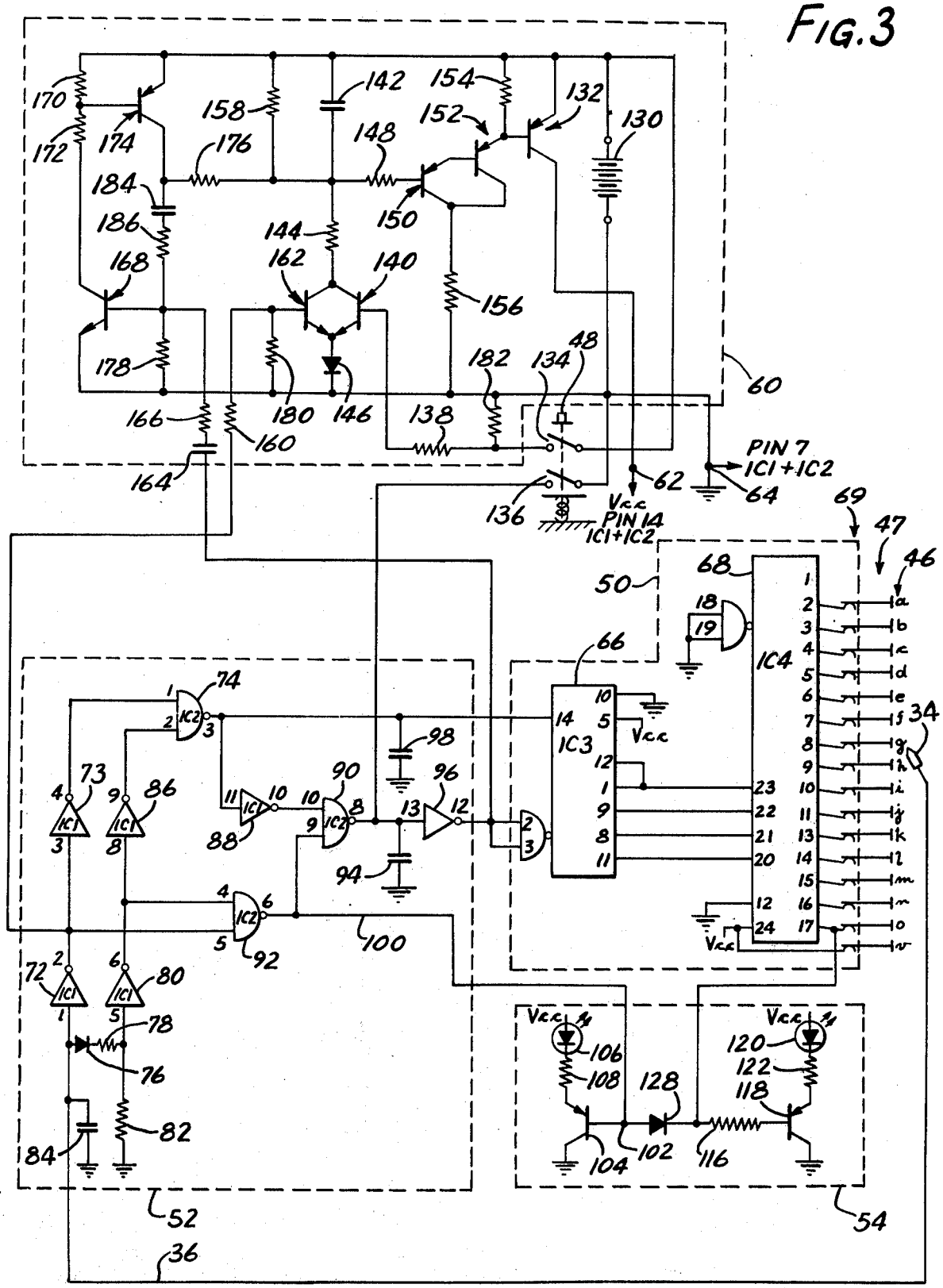
FIG. 3 is a diagrammatic illustration of the device illustrated in FIG. 1, showing the logic and other circuitry utilized in a preferred form of the invention.

FIG. 3 illustrates a preferred embodiment of the response sequence evaluation circuit of the present invention. It is in part schematic and in part a logic diagram. The necessary operating voltages (Vcc) for the various logic circuits are provided by a power supply 60 on an output terminal 62 with ground at a grounded terminal 64. The logic units are contained in integrated circuits with the terminals identified by the pin numbers for the particular integrated circuits used in constructing an actual operating unit, wherein the inverters indicated as IC1 comprise a hex-inverter MC836, and the NAND gates indicated as IC2 are formed from quad 2-input NAND gates MC846. IC3 is a four-bit binary counter SN7493. IC4 is a 4 line to 16 line (1 of 16) decoder SN74154.

With the connections as indicated in FIG. 3, the sequencing means 50 comprises a four-bit binary counter 66 (IC3) and a 4 line to 16 line decoder 68 (IC4). With these units connected as shown, the four-bit binary counter 66 is reset to its first state by a reset signal applied to terminals 2 and 3 and thereafter advances when actuated one count at a time to successive states repetitively over a 16 state cycle. When coupled as shown to the 4 line to 16 line decoder 68, the counter 66 causes the output terminals of the decoder to be grounded successively one at a time. The 4 line to 16 line decoder 68 has 16 outputs connected as shown by connectors 69 and conductors 47 respectively to conductive segments 46a–o of the tracing board 32, with output 1 not connected to any segment 46 and with the border segment 46v connected to the supply voltage Vcc. When the counter 66 is reset, output 1 is grounded while all other outputs and hence all segments 46a–o are at the supply voltage Vcc. As the counter advances through successive states, the segments 46a–o are successively and sequentially grounded one at a time in alphabetical order a to o. Segment 46v is at all times at the supply voltage Vcc.

When the student manually moves the probe 34 to contact a particular segment 46a–o, the comparator circuit 52 determines whether or not the physical position of the probe 34 is in contact with that segment of segments 46a–o that is grounded by the operation of the sequencing means 50. In this way, the comparator 52 compares the position of the stylus 34 with the state of the sequencing means 50. The stylus 34, while functioning mechanically as part of the motor input from the student, is also functionally a probe for the comparator 52 to which it is connected by the cable 36. As shown, the stylus 34 itself has an insulated handle 70 and a conductive tip 71, with the tip connected to the conductor of the cable 36. Thus, when the tip 71 of the stylus 34 is touching the segment 46a–o corresponding to the grounded output of the sequencing means 50, the stylus 34 (more exactly its tip 71) will be at ground potential, whereas if it touches any other segment including segment 46v, the stylus will be at Vcc.

The circuit can best be understood by considering it on the basis of the logic functions it performs. Following conventional logic terminology, the ground signal will be considered "0" and the supply voltage signal "1".

Also, as the comparator circuit is best understood in connection with an actual operating sequence, it will be described first for the sequence where the student performs as he is supposed to, namely, by scribing successively test points 46a–o in their proper order.

As mentioned above, the student begins by pushing the pushbutton 48. Although the actual starting operation will be explained in greater detail below, it will suffice for the moment to know that this serves to reset the four-bit binary counter 66, grounding output point 1 of the 4 line to 16 line decoder 68. Thus, when the student first touches the segment 46a, as is proper, a "1" is detected at the stylus 34 and is transmitted over the cable 36 to the comparator circuit 52. The "1" is applied to input 1 of an inverter 72 which produces an "0" at its output 2. This signal is again inverted by an inverter 73 to produce a "1" which is applied to input 1 of a NAND gate 74. The "1" input to the comparator 52 is also applied through a diode 76 and a resistor 78 to input 5 of an inverter 80. The input 5 is also connected to ground through a resistor 82, which serves to make the input to the inverter 80 " 0" when it is not receiving an input signal from the cable 36. The input for the inverter 72 is also applied to a grounded capacitor 84 which serves to hold the incoming signals and eliminate spurious input signals, such as switching transients. A "1" input to the inverter 80 produces a "0" at its output. The "0" is applied to an inverter 86 which again inverts the signal to "1" which is applied to the input 2 of the NAND gate 74. With both inputs of the NAND gate 74 at "1", its output is "0". This "0" output is applied to an inverter 88 which inverts the signal to a "1" and applies it to input 10 of a NAND gate 90. At the same time the "0" signals at the outputs of inverters 72 and 80 are applied respectively to inputs 4 and 5 of a NAND gate 92 which thereupon produces a "1" at its output. This signal is applied to input 9 of NAND gate 90. With both inputs of the NAND gate 90 at "1", the output at terminal 8 is "0".

It is at the output terminal 8 of the NAND gate 90 that an error signal is developed. Under the conditions assumed above the stylus 34 is touching an ungrounded segment 46a. This is an apparent error. However, 46a is the segment that it is desired that the student touch first. When the student has done is touch the segment connected to the output point next following the grounded output point. Thus, the signal on pin 8 of the NAND gate 90 is not a true error signal.

The circuit includes means for discriminating a true error signal from an apparent error signal that is not a true error signal. To this end, a capacitor 94 is coupled between the ground and the output of the NAND gate 90. This delays the signal, and only after predetermined delay would the signal be applied to input 13 of an inverter 96, the output of which is the true error signal. Meanwhile, however, the "0" signal at the output of the NAND gate 74 is applied to a shunt capacitor 98, which smooths out line disturbances, and passes to terminal 14 of the four-bit binary counter 66 advancing its output to the next state, thereby grounding output point 2 of the 4 line to 16 line decoder 68 and hence grounding point 46a. This produces a "0" signal on cable 36 which indicates that the stylus 34 is touching the segment 46 corresponding to the current state of the sequencing means. This "0" signal is then inverted by the inverter 72 to a "1" and further inverted by the inverter 73 to a "0" thereby driving the output of the NAND gate 74 to a "1". The "1" is inverted by the inverter 88 to a "0" which produces a "1" at the output of the NAND gate 90 thereby cancelling the previous "0", or apparent error signal. The "1" output from the NAND gate 74 does not advance the counter 66. Therefore, "1" remains applied to the capacitor 94 and after delay appears at the input 13 of the inverter 96. The "1" is inverted by the inverter 96 to a "0" at the output 12 of the inverter 96. This is the true "error" signal, which under the assumed conditions is indicative of correspondence between the segment 46 touched by the stylus 34 and the state of the sequencing means 50. "1" at the output 12 of the inverter 96 would have indicated true error or lack of correspondence.

As the student advances the stylus 34 in proper sequence through segments 46a–o, the above-described steps are repeated, the comparator 52 first noting a potential error and switching the counter 66 to its next stage, thereby cancelling the error signal, until the student reaches the final segment 46*o*.

In order that the student may be informed that he is performing properly, the signal from the NAND gate 92 is applied over a conductor 100 to a terminal 102 in the display unit 54. This, too, is an error or evaluation signal indicating correspondence or lack thereof between the position of the stylus 34 and the state of the sequencing means 50. As noted above, when the position of the stylus 34 is on the grounded segment 46, a "1" appears at the outputs of the inverters 72 and 80. When these "1's" are applied to respective inputs 4 and 5 of the NAND gate 92, the output of the NAND gate 92 is "0", indicating a correct placement of the probe 34 by the student. A "0" signal on the conductor 100 therefore indicates proper performance. This signal is applied to the base of a PNP transistor 104 which is connected in series with a light-emitting diode 106 and a resistor 108, between the power supply Vcc and ground. (Diodes may be used instead of the resistor 108). The "0" signal on the conductor 100 turns on the PNP transistor 104, thus activating the light-emitting diode 106 which lights the lamp 56, indicating to the student that he is performing properly. As with the "error" signal at the output 3 of the NAND gate 74, the error signal at the output 6 of the NAND gate 92 momentarily indicates an error when the student moves to the next proper segment 46, producing a "1" at the stylus 34. This causes no difficulty here however, the transistor 104 goes off momentarily when the stylus 34 is advanced but comes back on as soon as the counter 66 advances to catch up. The action is so rapid as to cause no flicker perceivable by the student.

Upon the completion of the cycle of the four-bit binary counter 66, a "0" is developed at the output 17 of the 4 line to 16 line decoder 68. Thus, upon completion of a successful scribing of segments 46*a–o* in proper sequence, output 17 develops an "0" signal which is applied through a resistor 116 to the base of a PNP transistor 118 connected in series with a light-emitting diode 120 and a resistor 122 between the power supply Vcc and ground. (Diodes may be used instead of the resistor 122.) The application of the "0" to the base of the transistor 118 turns on the transistor, completing the circuit from Vcc to ground and turning on the light-emitting diode 120, which provides the light for the lamp 58. At the same time, the "0" signal is applied through an isolating diode 128 to the base of the transistor 104 irrespective of the signal from the NAND gate 92, thereby assuring that both lamps 56 and 58 are lit. This informs the student (and his teacher) not only that he is performing everything satisfactorily but that he has performed satisfactorily through the entire sequence. As the student does not then have access to a segment connected to the output 1 of the decoder 68, the circuit remains in this condition for a predetermined time, as will be explained below, or until the student touches the pushbutton 48, which resets the counter 66.

Going now to the operation of the device upon the occurrence of an actual error, in the event the student makes an improper selection of segments 46*a–o*, or strays from the path 38 onto the border segment 46*v*, not only will a "1" appear on the cable 36 which then through inverters 72 and 73 and 80 and 86 produces a "0" signal at the output of NAND gate 74, but the consequent triggering of the counter 66 to advance the sequencing means 50 to its next state leaves the signal at "1" on the cable 36 and consequently at "0" at the output of the NAND gate 74 and "1" at input 10 of the NAND gate 90. At the same time, "1" on the cable 36 produces "0" outputs from inverters 72 and 80, whereupon the output of the NAND gate 92 goes to "1" turning off the light-emitting diode 106 and consequently turning off the lamp 56, thereby indicating to the student that he has erred. This also applies a "1" to the other input 9 of the NAND gate 90, producing a "0" at its output and a true "1" error signal at the output of the inverter 96. This resets the four-bit binary counter 66 by applying positive reset signals to its terminals 2 and 3. Further, in a manner described below in connection with the power supply 60, the power supply is turned off by the true error signal, disabling the device until the pushbutton 48 is again operated.

In addition to the two conditions mentioned above, one where the stylus 34 is touching the grounded segment 46*a–o* and the other where it is touching an energized segment 46*a–o* or *v*, there is a third condition which is related to both erroneous and correct responses. That condition is when the stylus 34 is not touching any segment at all. That condition obtains in the normal course of proper scribing a path 38 made of discontinuous segments, as in the letter A shown in FIG. 6. On the other hand, it also obtains when the student lifts the stylus or gets onto the insulating coating 44. with the circuit illustrated, such condition is counted as neither right nor wrong, unless persisted in. It will neither reset nor advance the four-bit binary counter 66. It does, however, turn off the lamp 56. These are the functions of the inverters 80 and 86, diode 76 and resistors 78 and 82.

When the stylus 34 is not touching a segment 46*a–o* or *v*, it is neither grounded nor at the supply voltage Vcc. It may be said to be floating. However, in the circuit illustrated, the operation of the particular inverter 72 requires at its input passing current of 1.4 milliamperes to ground. In the absence of ground or the supply voltage Vcc on the stylus 34, a positive voltage is developed on the input which is sufficient to register as a "1". This signal is developed across the series connection of the diode 76 and resistors 78 and 82 to ground. The resistor 82 connected directly to ground has substantially less resistance than that of the other resistor 78. Because of this and the voltage drop across the diode 76, the input to the inverter 80 in the floating condition is much less than the input to the inverter 72. The relative resistance of the resistors 78 and 82 and the drop across the diode 76 are empirically determined to cause the floating condition to register as a "0" at the input to the inverter 80 while registering as a "1" at the input to the inverter 72. Resistances of 1800 ohms and 910 ohms have been found suitable for the resistors 78 and 82, respectively.

Under such conditions, "1" appears at the output of the inverter 80, "0" being thereby produced at the output of the inverter 86 and "1" at the output of the NAND gate 74, indicating no error and hence not actuating the four-bit binary counter 66. This is inverted to "0" by the inverter 88, making the output of the NAND gate 90 "1"; this is inverted to "0" by the inverter 96, indicating no error and hence not resetting the four-bit binary counter 66. At the same time "0" appears at the output of the inverter 72, thereby producing "1" at the output of the NAND gate 92 which turns off the transistor 104 and hence the lamp 56. The floating condition of the stylus 34 thus turns off the lamp 56, indicating to the student that he is not touching the proper segment 46a–o but it does not advance or reset the four-bit binary counter 66. If the student responds by touching the appropriate segment, the circuit operates as described above. Should the student fail to touch the proper segment within a predetermined time, the circuit is disabled by turning off the power supply 60, as described below in greater detail.

The power supply 60 may take the form illustrated in FIG. 3, wherein the power is derived from a voltage source 130 which is connected between the ground terminal 64 and the Vcc output terminal 62 through a PNP transistor 132. The voltage source 130 may be a battery or a conventional electronic power supply. When a battery is used, the circuit has the advantage of conserving battery power when the apparatus is not in use. However, whichever voltage source is used, the circuit provides the disclosed functions, including turning off the circuit after a time whenever the student fails to pursue the proper course within the time or when he has successfully completed the sequence. It also assures that the device is in its off state when a succeeding student begins to use the machine. The device remains off until the pushbutton 48 is again depressed.

When the student depresses the pushbutton 48, the pushbutton closes switches 134 and 136. The pushbutton is preferably spring loaded to open the switches 134 and 136 when the pushbutton 48 is released. Closing of the switch 136 grounds the input to the inverter 96, producing a "1" signal at the output 12 of the inverter 96 which, like a true error signal, resets the four-bit binary counter 66. Closure of the switch 134 applies 6 volts or a "1" signal through a resistor 138 to the base of an NPN transistor 140, turning on the transistor 140. This completes a circuit between the positive terminal of the battery 130 and ground through a capacitor 142, a resistor 144 and a diode 146, thus charging the capacitor 142 to the voltage of the battery 130. Switches 136 and 134 are thereafter opened upon release of the pushbutton 48. The voltage on the capacitor 142 is applied through a resistor 148 to the base of a PNP transistor 150 which is a part of a Darlington circuit also including a PNP transistor 152 and series resistors 154 and 156. With the Darlington circuit turned on, the current through the resistor 154 develops a biasing voltage for the transmitter 132, turning on the transistor 132 and applying the potential of the battery 130 to the Vcc output terminal 62.

A resistor 158 is connected in shunt of the capacitor 142 and therefore acts to discharge it when the charging circuit is opened. In time, the voltage on the capacitor 142 becomes insufficient to keep the Darlington circuit on, and the transistor 132 is thereupon turned off, disconnecting Vcc output terminal 62 from the and, consequently, substantially stopping the drain on the battery. The length of time before the voltage on the capacitor 142 drops sufficiently to turn off the Darlington circuit depends, of course, upon the RC time constant of the circuit comprising the resistor 158 and the capacitor 142. Preferably, a time constant is provided that will disconnect Vcc output terminal 62 from the battery 130 after about 30 seconds, giving the student sufficient time to take action.

Once the student takes action and moves the stylus 34 to the next proper segment 46a–o, the sequencing means 50 moves to its next state, resulting in a "0" signal on the cable 36 with a consequent "1" signal at the output of the inverter 72. This "1" or positive signal is applied through a resistor 160 to the base of an NPN transistor 162 which is connected in parallel with the transistor 140. The positive signal applied to the base of the transistor 162 turns it on, recharging the capacitor 142 to its full charge each time the student makes a correct move, just as it was originally charged when the transistor 140 was turned on. This restarts the time for the power supply 60 to remain on. This gives the student time to go from segment to segment in the floating condition described above, while disabling the circuit if he waits too long. The corollary to this is that the power supply 60 turns off, disabling the circuit, whenever the student does not continue making correct responses, even when he does not make a sequencing error. The delay in turning off the power supply keeps the lamps 56 and 58 lit for a time after the proper completion of the prescribed sequence, giving any supervisor time to observe what the student has achieved, before the power goes off.

Should the student make an error in sequence, the consequent "1" signal at the output of the inverter 96 is applied through a differentiating capacitor 164 and resistor 166 to the base of an NPN transistor 168 which is connected in series with resistors 170 and 172 across the battery 130. The positive signal applied to the base of the transistor 168 turns it on, thereby developing a voltage across the resistor 170 which is applied to the base of a PNP transistor 174 to turn on the transistor 174. The transistor 174 is connected across the capacitor 142 through a resistor 176. Thus, when the transistor 174 is turned on, the capacitor 142 is discharged through the resistor 176. The resistor 176 has much less resistance than the resistor 158 and consequently discharges the capacitor 142 relatively instantaneously, thus turning off the transistor 132 and decoupling the battery 130 from the Vcc output terminal 62. Thus, the battery 130 is turned off by a wrong move by the student as well as upon the passage of a predetermined time without touching the proper segment, whichever first occurs.

The input to the base of the transistor 168 is through the capacitor 164, and the base is connected to ground through a resistor 178. The transistor 168 is thus triggered by a positive going transition or "1" from the output of the inverter 96 and would immediately go off were it not held on by other means. That means is the series connection of a capacitor 184 and a resistor 186 connected between the collector of the transistor 174 and the base of the transistor 168. This provides the flow of current through the resistor 178, keeping transistors 168 and 174 on, until the capacitor 184 is charged. The duration of the period the transistors 168 and 174 are kept on depends upon the time constant of the circuit as may be determined by selection of an appropriate capacitance for the capacitor 184. 0.1 to 0.2 seconds has been found long enough for discharging the capacitor 142 to turn off the power supply. On the other hand, this time is short compared to the time for operation of the pushbutton 48 so that, although closing of the switch 136 develops a positive pulse to turn on the transistors 168 and 174, they are turned off before the pushbutton 48 is released, thus leaving the capacitor 142 fully charged.

Figure 5:
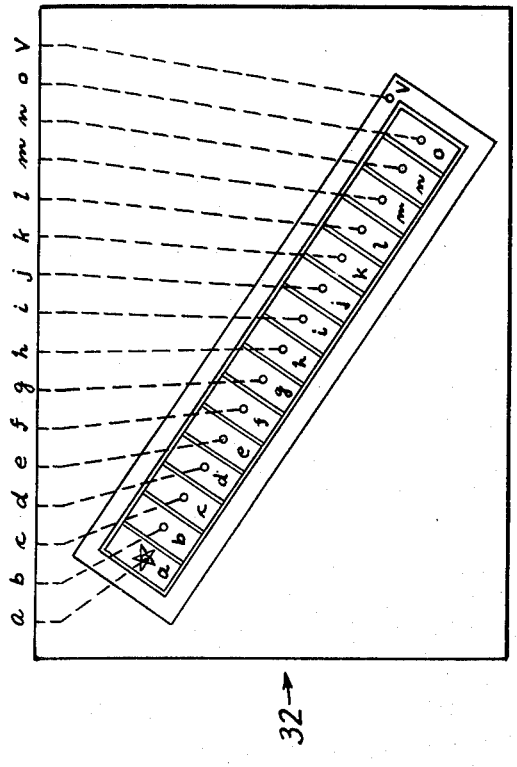
FIG. 5 is a plan view, partly diagrammatic, of such training board showing a more convoluted path.
Figure 6:
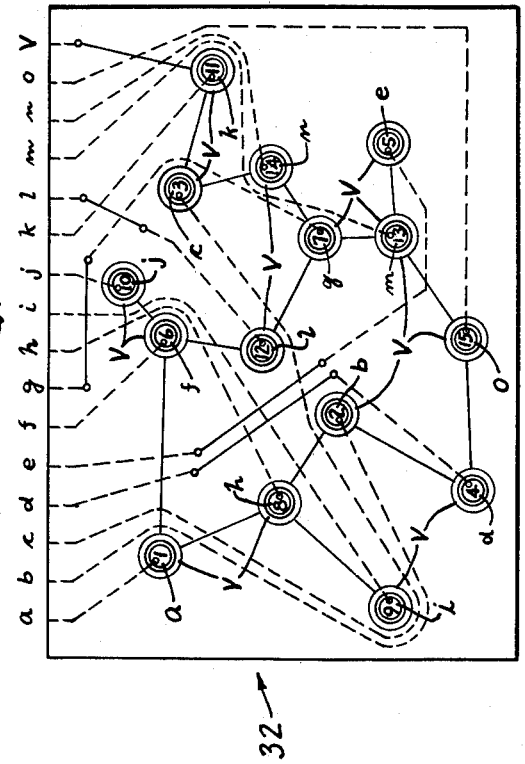
FIG. 6 is a plan view, partly diagrammatic, of such training board showing a segmented path forming an alphanumeric symbol.

Resistor 180 and the series connection of resistors 138 and 182 are connected respectively between ground and the bases of the respective transistors 162 and 140, thus assuring grounding of the respective bases and the turning off of the respective transistors when no signals are applied.

Where the path 38 intersects or intercepts itself as in the paths illustrated in the boards of FIGS. 5 and 6, it is necessary to touch the same segment 46 more than once, in the proper sequence. To this end that segment is connected by the conductors 47 and connectors 69 to more than one of the outputs of the decoder 68, as illustrated. For the particular integrated circuit 74154 utilized as the decoder 68, it is desirable to protect the circuit by connecting a diode 188 in series with each conductor 47 connected from a common segment 46 to a respective one of a plurality of outputs, and coupling the segment to the voltage Vcc through a resistor 190. These electronic elements, shown diagrammatically, may be affixed to the underside of the board 32.

Figure 7:
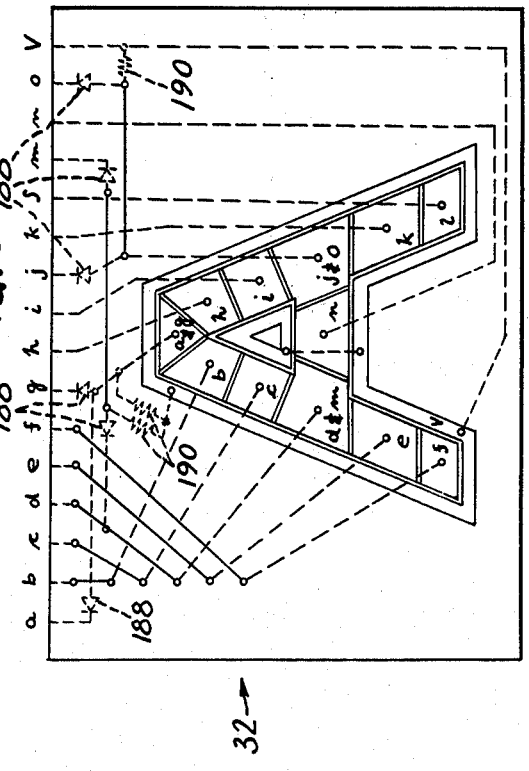
FIG. 7 is a plan view of such training board showing segments to be touched discretely, with the sequence of teaching identified by indicia on the respective segments.

In FIG. 7 is illustrated a training board wherein the segments 46a–o are disposed randomly about the surface of the board 32 and are each marked with an identifying indicium, which may be alphanumeric. As illustrated, the indicia may be the numerals 1 to 15. The student is instructed to touch the numerals discretely in numerical order, without touching the borders 40, whereupon the device of the present invention monitors his performance in the manner indicated above. This teaches numbers as well as visual-motor skills. The alphabet may be similarly utilized. Particularly in this embodiment of the invention, the border segments 46v may be omitted.

Many other geometric figures or designs may be utilized on the boards 32, including that described in the aforesaid copending application Ser. No. 302,730, and may further include the scribe guides therein disclosed. Further, the sequence may be made longer or shorter than the 15 segment sequence described by utilizing modifications of the circuit specifically described and illustrated. More than one figure or design may be placed on a single board, such as an entire word.

It is also within the present invention to provide means for counting the number of completions of proper sequences and providing a feedback signal to the student after the successful completion of a predetermined plurality of complete proper sequences. To this end, the display unit shown and described in the aforesaid copending application Ser. No. 302,730 may be utilized. The disclosure of that copending application is hereby incorporated herein by reference.

Various other modifications may be made in the device within the scope of the present invention. Other logic circuits may be used to produce the same or similar results. For example, by modification of the circuitry, the sequencing means 50 may be caused to change state in advance of the movement of the stylus 34. In that case, when the comparator senses that the position of the stylus 34 corresponds to the state of the sequencing means 50, an evaluation signal indicating correctness is derived. That signal is then latched to preserve it until the stylus is moved to another segment 46, and at the same time the comparator triggers the sequencing means 50 to cause it to go to its next state. If the student moves to the next correct segment, the process is repeated. It is upon moving to the wrong segment that the comparator senses lack of correspondence between stylus position and the state of the sequencing means and passes an evaluation signal to the display unit to cause it to indicates to the student that he has erred.

Although the preferred embodiment of the invention includes a visual display unit 54, other information feedback means may be used, such as means providing aural signals.

The digital logic system as shown and described is in the form of diode-transistor logic (DTL) and transistor-transistor logic (TTL). Other forms of digital logic may be used.

In the particular preferred form of the invention shown and described, the position of a conductive stylus relative to conductive segments was sensed to provide stimulus for the logic system. The apparatus may be modified to sense the position of other styli or even the position of the student's finger. It may be modified to sense position other than by conduction, as for example, by changes in capacitance, or by the presence of heat or light or a magnetic field.

The device may also be modified to include the sequential feature as one of several optional modes of operation. For example, simple completeness of touching all segments could be monitored in another mode.

Other variations may be made by those skilled in the art without departing from the spirit and scope of the invention.

What is claimed is:

1. An eye-hand perceptual-motor trainer for training a student in making predetermined sequential perceptual-motor responses, said trainer comprising: a visual-kinesthetic sequence training board having a plurality of stations thereon touchable by the student and spatially arranged in a predetermined manner, sequencing means for providing successively a plurality of unique output states each corresponding to a respective one of said stations, said sequencing means operating when actuated to advance successively from state to state in a preseterrmined sequence, comparator means for comparing the state of said sequencing means with the station touched by the student, and in response to such comparison actuating the sequencing means upon each change in station touched and producing an evaluation signal indicating whether or not the student is touching the stations in the sequence corresponding to said predetermined sequence, and information feedback means responsive to said evaluation signal for producing a feedback signal apprising the student whether or not he is performing appropriately.

2. An eye-hand perceptual-motor trainer for training a student in making predetermined sequential perceptual-motor responses on a visual-kinesthetic sequence training board having a plurality of discrete segments thereof touchable by the student and spatially arranged in a predetermined manner, said trainer comprising sequencing means for providing successively a plurality of unique output states each corresponding to a respective one of said board segments, said sequencing means operating each time it is actuated to advance successively from state to state in a predetermined sequence, comparator means for comparing the state of said sequencing means with the board segment touched by the student, and in response to such comparison actuating the sequencing means once upon each change in board segment touched and producing an evaluation signal indicating whether or not the student is touching the segments in the sequence corresponding to said predetermined sequence, and information feedback means responsive to said evaluation signal for producing a feedback signal for apprising the student whether or not he is performing appropriately.

3. The trainer of claim 2 wherein said comparator means comprises means for acting upon failure of the touched segment to correspond to the state of said sequencing means to actuate said sequencing means once to advance said sequencing means to its next successive state, and means for delaying determination of error until after said sequencing means thereupon changes state, whereby proper sequence is indicated by the evaluation signal so long as the student moves from the segment corresponding to the state of said sequencing means to the segment corresponding to its next successive state.

4. The trainer of claim 2 wherein said comparator means includes means for producing an error signal when a segment is touched out of the predetermined sequence, said trainer including means responsive to said error signal for prohibiting further comparison in said sequence.

5. An eye-hand perceptual-motor trainer for training a student in making predetermined sequential perceptual-motor responses, said trainer comprising: a visual-kinesthetic sequence training board having a plurality of discrete segments thereof touchable by the student and spatially arranged in a predetermined manner along at least one path visible to the student, sequencing means for providing successively a plurality of unique output states each corresponsing to a respective one of said board segments, said sequencing means operating each time it is actuated to advance successively from state to state in a predetermined sequence, comparator means for comparing the state of said sequencing means with the board segment touched by the student, and in response to such comparison actuating the sequencing means once upon each change in board segment touched and producing an evaluation signal indicated whether or not the student is touching the segments in the sequence corresponding to said predetermined sequence, and information feedback means responsive to said evaluation signal for producing a feedback signal for apprising the student whether or not he is performing appropriately.

6. An eye-hand perceptual-motor trainer for training a student in making predetermined sequential perceptual-motor responses, said trainer comprising: a visual-kinesthetic sequence training board having a plurality of stations thereon touchable by the student and spatially arranged in a predetermined manner, sequencing means for providing successively a plurality of unique output states each corresponding to a respective one of said stations, said sequencing means operating when actuated to advance successively from state to state in a predetermined sequence, comparator means for comparing the state of said sequencing means with the station touched by the student, and in response to such comparison actuating the sequencing means upon each change in station touched in the sequence corresponding to said predetermined sequence and producing an evaluation signal indicating whether or not the student is touching the stations in the sequence corresponding to said predetermined sequence, said comparator means including means for producing an error signal when a segment is touched out of the predetermined sequence, means responsive to said error signal for prohibiting further comparison in said sequence, and information feedback means responsive to said evaluation signal for producing a feedback signal apprising the student whether or not he is performing appropriately.

7. An eye-hand perceptual-motor trainer for training a student in making predetermined sequential perceptual-motor responses on a visual-kinesthetic sequence training board having a plurality of discrete segments thereof touchable by the student and spatially arranged in a predetermined manner, said trainer comprising sequencing means for providing successively a plurality of unique output states each corresponding to a respective one of said board segments, said sequencing means operating each time it is actuated to advance successively from state to state in a predetermined sequence, comparator means for comparing the state of said sequencing means with the board segment touched by the student, and in response to such comparison actuating the sequencing means once upon each change in board segment touched in the sequence corresponding to said predetermined sequence and producing an evaluation signal indicating whether or not the student is touching the segments in the sequence corresponding to said predetermined sequence, said comparator means including means for producing an error signal when a segment is touched out of the predetermined sequence, means responsive to said error signal for prohibiting further comparison in said sequence, and information feedback means responsive to said evaluation signal for producing a feedback signal for appraising the student whether or not he is performing appropriately.

8. The trainer of claim 7 wherein said comparator means includes means for acting upon failure of the student to touch any segment to produce an evaluation signal indicative of error without actuating said counter.

9. The trainer of claim 8 including delay means for delaying for a predetermined period the production of said evaluation signal upon failure of the student to touch any segment.

10. The trainer of claim 7 wherein said information feedback means includes means responsive to said evaluation signal for providing a feedback signal to the student indicating whether or not he is touching the board segments in proper sequence, and means coupled to said sequencing means for identifying the completion of a complete proper sequence.

11. The trainer of claim 10 wherein said information feedback means includes means coupled to said sequencing means for identifying the completion of a complete proper sequence and providing another feedback signal to the student upon the completion of a predetermined number of complete proper sequences.

12. The trainer of claim 7 wherein said comparator means includes means for producing a reset signal when a segment is touched out of the predetermined sequence, and said sequencing means includes means responsive to said reset signal for placing said sequencing means in a starting state.

13. The trainer of claim 12 including manually operated start means for placing said sequencing means in said starting state wherein the touching of the segment corresponding to the beginning of the predetermined sequence produces an evaluation signal indicating that the student is proceeding in the predetermined sequence.

14. An eye-hand perceptual-motor trainer for training a student in making predetermined sequential perceptual-motor responses, said trainer comprising: a visual-kinesthetic sequence training board having a plurality of discrete segments thereof touchable by the student and spatially arranged in a predetermined manner along at least one path visible to the student, sequencing means for providing successively a plurality of unique output states each corresponding to a respective one of said board segments, said sequencing means operating each time it is actuated to advance successively from state to state in a predetermined sequence, comparator means for comparing the state of said sequencing means with the board segment touched by the student, and in response to such comparison actuating the sequencing means once upon each change in board segment touched in the sequence corresponding to said predetermined sequence, and producing an evaluation signal indicating whether or not the student is touching the segments in the sequence corresponding to said predetermined sequence, said comparator means including means for producing an error signal when a segment is touched out of the predetermined sequence, means responsive to said error signal for prohibiting further comparison in said sequence, and information feedback means responsive to said evaluation signal for producing a feedback signal for apprising the student whether or not he is performing appropriately.

15. The trainer of claim 14 wherein said discrete segments comprise metallic members insulated from one another, said sequencing means comprises a digital counter, and said comparator means comprises an electronic digital logic circuit.

16. The trainer of claim 15 including means comprising a manualy operable electrically conductive stylus by which the student touches said segments for providing an electronic position dependent signal to said comparator means.

17. The trainer of claim 16 wherein said sequencing means includes means for providing a state indicating potential to the one of said segments corresponding to the state of said sequencing means while providing a different potential to the rest of said segments; and said comparator means includes means for actuating said sequencing means once in response to the signal developed by said stylus only when said stylus touches a segment to which said different potential is provided, and means for delaying said evaluation signal until after said sequencing means thereupon changes state, whereby said evaluation signal indicates proper sequence when said stylus is touching the segment to which said state indicating potential is applied after said sequencing means has changed state.

18. The trainer of claim 16 wherein the electronic circuitry thereof is electrically powered, and means are provided for supplying power so long as the stylus touches the segment corresponding to the state of the sequencing means and thereafter turning off the power upon the lapse of a predetermined time or the touching of the stylus to any other segment except that corresponding to the next subsequent state of the sequencing means, whichever first occurs.

19. A trainer according to claim 14 comprising a plurality of said visual-kinesthetic sequence training boards separately utilizable and providing different respective arrangements of said segments.

20. A trainer according to claim 14 wherein a visible border about said path comprises one of said segments for which there is no corresponding state of said sequencing means, whereby wandering form said path to said border provides an indication of error to the student.

21. A trainer according to claim 14 wherein said segments are arranged to form an alphanumeric symbol.

22. A trainer according to claim 14 comprising a plurality of said visual-kinesthetic sequence training boards separately utilizable and providing respective paths requiring different degrees of skill.

* * * * *